(No Model.)

J. W. RINGROSE.
TREATING LEATHER THONGS FOR THE MANUFACTURE OF FLY NETS.

No. 343,202. Patented June 8, 1886.

Atteste:
John G. Hinkel Jr.
Wm. J. Sayers.

Inventor:
Jesse W. Ringrose
By Foster & Freeman
attys

UNITED STATES PATENT OFFICE.

JESSE W. RINGROSE, OF MECHANICSBURG, PENNSYLVANIA.

TREATING LEATHER THONGS FOR THE MANUFACTURE OF FLY-NETS.

SPECIFICATION forming part of Letters Patent No. 343,202, dated June 8, 1886.

Application filed May 14, 1885. Serial No. 165,482. (No model.)

*To all whom it may concern:*

Be it known that I, JESSE W. RINGROSE, a citizen of the United States, residing at Mechanicsburg, in the county of Cumberland and State of Pennsylvania, have invented certain new and useful Improvements in Treating Leather Thongs for Manufacture of Fly-Nets, of which the following is a specification.

In the preparation of the leather thongs or strips which are used in the manufacture of leather nets for horses it has heretofore been the custom to apply the dubbing, consisting of oil, tallow, and lampblack, or other like composition, to the strips by hand. This process is expensive, tedious, and slow, the application is not uniform, and the material does not present when completed the high degree of finish that is often desired.

I have discovered that a much better article, both as to finish and uniformity of quality, may be produced by subjecting the strips to the action of a rapidly-revolving brush, whereby they are heated, so as to open the pores at the time that the dubbing is applied, and whereby they are smoothed and polished. The heating action of the brush in opening the pores causes a larger proportion of the dubbing to be absorbed than results when the dubbing is applied by the means of the hand, in which case the material is compacted and condensed and the pores are closed. A further result of this mode of treatment is the greater rapidity of the operation, and the dispensing with the use of skilled labor, whereby the cost of the preparation of the material is greatly lessened.

Different apparatus may be employed in carrying out my improved process, which, however, I will describe in detail in connection with apparatus illustrated in the accompanying drawings, in which—

Figure 1:
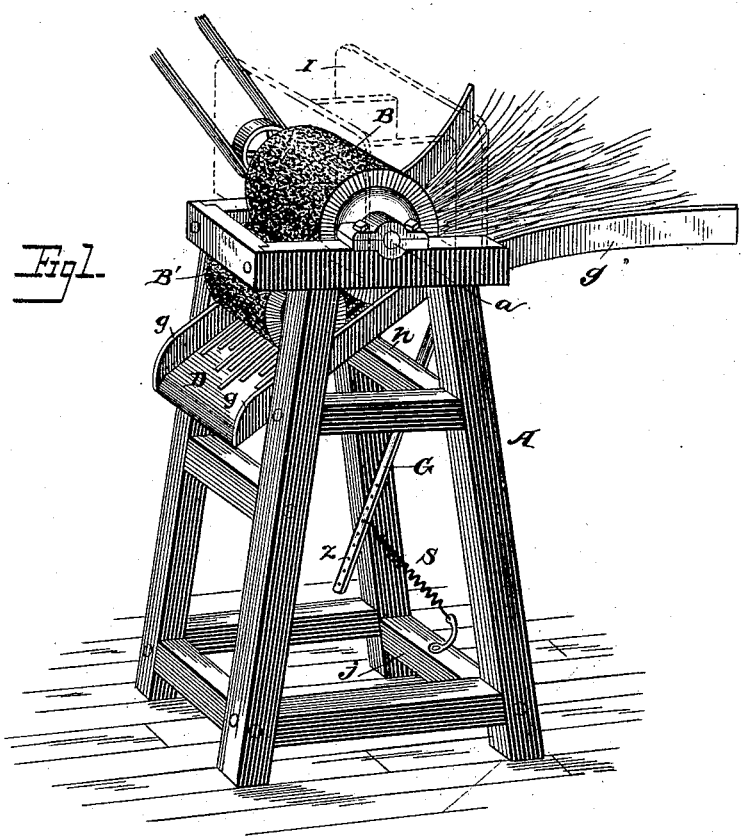
Figure 2:
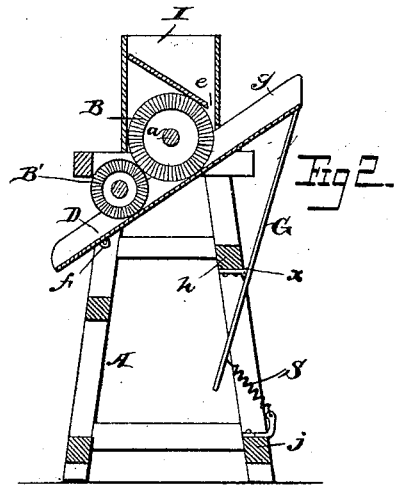
Figure 3:
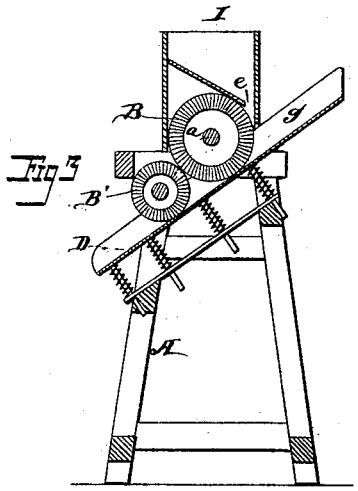

Figure 1 is a perspective view of an apparatus illustrating my invention. Fig. 2 is a vertical section of said apparatus. Fig. 3 is a section showing the modification.

The frame A is of any suitable construction to support the operating parts hereinafter described. At the top of the frame are bearings for the shaft $a$ of a brush, B, and below the latter, at an angle of about thirty degrees, is arranged a table or platform, D, which has an elastic or spring bearing tending to keep it in contact with the periphery of the cylindrical brush.

In Fig. 1 the platform D is shown as hinged or pivoted near the lower end to a cross-bar or pivots, $f$, and extending upward beneath the brush and bearing upon the upper end of a lever, G, pivoted at $x$ to a cross-bar, $h$, of the frame, and connected at the lower end to a spring, S, having a hook adapted to notches $z$ in the lever, the lower end of the spring being attached to the cross-bar $j$.

The platform D expands in width at the upper end, and is provided with side flanges, $g$. Above the brush B is supported a trough, I, provided with a bottom inclined toward an opening or slot, $e$, and within this trough is placed the dubbing material, which, as the brush is revolved rapidly in the direction of its arrow, is fed to or upon the brush. As the brush revolves, the table or platform is carried against the periphery of the same by the action of the spring S, and I have found that this contact of the fibers of the brush with the table is important, inasmuch as it results in preventing the matting down of the fibers, whereas if the table is stationary, or does not bear upon the brush, the fibers become matted down, and the brush becomes inoperative in a comparatively short time.

The leather thongs or strips to be operated upon are placed upon the platform above the brush by the operator, who seizes a mass of such thongs in his hands, places them upon the platform, and moves them toward the brush, whereby they are instantly untangled and drawn downward in straight parallel lines, and carried along the platform beneath the brush to any extent permitted by the operator, who maintains his hold upon the upper ends of the thongs, and draws the mass upward and permits it to slide alternately over the platform and under the brush. This action results in a heating of the material by the frictional contact of the brush-fibers with the material, so that the pores are opened and the dubbing, which is finely divided and spread upon the fibers of the brush, is beaten into the material by the rapid beating action of the fibers, and is caused to penetrate the same to a greater extent than is possible when the dubbing is applied by hand.

The reciprocation of the thongs, resulting from drawing them back and forth from the platform beneath the brush, imparts to them a smoothness and polish which cannot possibly be attained when the dubbing is applied by hand, while the application of the dubbing is affected by much greater rapidity than is possible in hand-operations.

After the mass of thongs has been treated as above described, it is withdrawn by an upward movement of the hand and reversed, so that the upper ends formerly held by the hands may be subjected to the operation of the brush.

In order to secure a greater polishing effect, I in some instances use a second brush, B', or two or more additional brushes may be used, the shafts of the same being so geared with the shaft $a$ that the auxiliary polishing-brushes shall have a more rapid motion than that of the dubbing-brush.

The spring bearing of the platform D not only causes the same to be brought in contact with the fibers of the brush, but also permits the platform to yield in proportion to the thickness of the mass of thongs subjected to action of the brush.

A modified form of support is illustrated in Fig. 3, where the entire platform rests upon spiral springs, so that the platform can sink throughout its whole extent.

Although I have referred to the operation of reciprocating the thongs as being performed by hand, it will be evident that they may be connected to a frame reciprocated automatically. I prefer, however, the hand-operation, inasmuch as it avoids the necessity of any definite arrangement of the thongs, which can be taken up by hand in loose bundles from the mass of material in the shop.

It is important in selecting the material which constitutes the brushing-surface of the cylinder to see that it shall be of such a character as not to be softened by the action of the dubbing. Bristles will not answer in connection with the dubbing usually employed. I therefore use wire or woody fibers in the preparation of the brush.

Without limiting myself to the precise construction and arrangement of parts shown and described, I claim—

1. The within-described improvement in preparing leather thongs, the same consisting in applying dubbing to the thongs while reciprocating them in contact with a rapidly-revolving brush, substantially as described.

2. The combination of a frame supporting the bearings of a revolving shaft, a cylindrical brush arranged upon said shaft, a hopper for dubbing, arranged to deliver the same adjacent to the brush, and a platform supported by spring-bearings arranged to carry the platform toward the brush, substantially as and for the purpose set forth.

3. The combination of a platform having spring-bearings, a revolving cylindrical brush arranged opposite the platform, a polishing-brush, and a hopper containing dubbing and arranged to deliver it to said brush, substantially as set forth.

4. The combination of an inclined platform pivotally supported at or near one end and a yielding bearing, substantially as described, at the opposite end, a revolving cylindrical brush, and a hopper arranged as and for the purpose set forth.

In testimony whereof I have signed my name to this specification in the presence of two subscribing witnesses.

JESSE W. RINGROSE.

Witnesses:
JACOB D. HINE,
J. L. SHELLEY.